3,429,905
ORGANOTIN-, ARSENIC AND ANTIMONY
1,1-ETHYLENE DITHIOLATES
William Lindsay Mosby, North Plainfield, N.J., assignor to American Cyanamid Company, Stamford, Conn., a corporation of Maine
No Drawing. Filed July 23, 1965, Ser. No. 474,476
U.S. Cl. 260—429.7   6 Claims
Int. Cl. C07d 105/00, 105/06, 107/00

ABSTRACT OF THE DISCLOSURE

Unsaturated dithiol compounds of the formula:

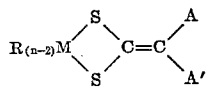

wherein M is a polyvalent metal selected from the group consisting of antimony, arsenic and tin; R is a monovalent hydrocarbyl radical selected from the group consisting of lower alkyl, monocyclic and bicyclic aromatic, and monocyclic ar(lower alkyl); $n$ is the valence of M; A is a monovalent radical selected from the group consisting of CN, COOR, CONH$_2$, CONHR, CONR$_2$, COR and NO$_2$; and A' is a member selected from the group consisting of hydrogen and A. These compounds are prepared by reaction of the corresponding alkali metal 1,1-ethylenedithiolate with a metal dihalide in an inert medium. The compounds are useful as fungicides, herbicides and bacteriocides.

---

This invention relates to, and has as its object, the provision of new compounds. More particularly, it relates to organo-metallic derivatives of unsaturated, carbon-containing dithiols represented by the Formula I:

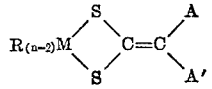   I wherein M is a polyvalent metal selected from the group consisting of antimony, arsenic and tin; R is a monovalent hydrocarbyl radical selected from the group consisting of lower alkyl (including cycloalkyl of 4–6 carbons), mono- or bicyclic aromatic (e.g., phenyl and naphthyl as well as lower alkyl substituted analogs), and monocyclic ar(lower alkyl); $n$ is the valance of M; A is a monovalent radical selected from the group consisting of CN, COOR, CONH$_2$, CONHR, CONR$_2$, COR and NO$_2$; and A' is a member selected from the group consisting of hydrogen and A.

The compounds of this invention exhibit biocidal properties. Thus, they are bacteriocidal, inhibiting the growth of E. coli, Staph. aureus and B. mycoides; fungicidal, inhibiting growth of Asper. niger, Fusarium moniliform and Penicillium citrium; and herbicidal, killing wheat and radish seeds. Accordingly, they can be used agriculturally in conventional formulations as fungicides, herbicides and bacteriocides.

To prepare the compounds of this invention, an alkali metal 1,1-ethylenedithiolate is reacted with a metal dihalide as in the following equation:

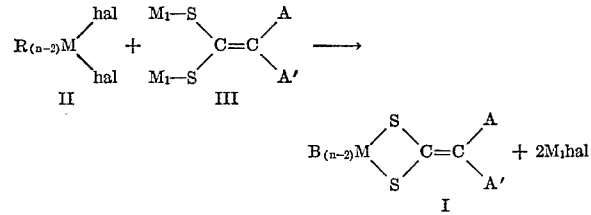

wherein R, M, A, A' and $n$ are as defined above, "hal" is halogen of atomic number above 9 and M$_1$ is an alkali metal such as sodium or potassium. The reaction can be carried out by contacting approximately equimolar amounts of the dihalide and dithiolate in a suitable reaction medium.

Suitable inert reaction media include ethylene glycol, diethyl ether, acetonitrile, dimethylformamide, "Diglyme," dimethylacetamide, dimethylsulfoxide, etc.

When the two reactants are contacted, some heat is usually evolved. Therefore, it is usually advantageous to combine the reactants at room temperature. Under certain conditions, it may be necessry to provide a cooling means to remove the heat of reaction. In a few cases, it may be necessary to apply heat to promote the completion of the reaction. Temperatures between room temperature and the boiling point of the reaction medium may be used The reactions are rapid and usually require only a short time for completion.

The reaction products may be isolated by any convenient means. It is advantageous to add water, when a water-miscible reaction medium has been used, whereupon the product precipitates, if it is not already precipitated.

Suitable dithiolates are alkali metal derivatives of 1,1-ethylenedithiols such as 1,1-dimercapto-2,2-dicyanoethylene, 1,1 - dimercapto-2,2-bis(ethoxycarbo)ethylene, 1,1-dimercapto-2-cyano-2-carbamoylethylene, 1,1-dimercapto-2,2-diacetylethylene and 1,1-dimercapto-2-nitroethylene.

Five types of organo-metallic dihalides may be used in the preparation of the compounds of this invention. They are shown in the following general formulae:

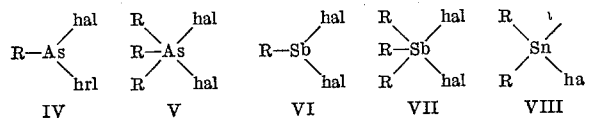

Accordingly, five main types of compounds of Formula I can be obtained by varying the particular dihalide which is reacted with the dithiolate. The types are shown in the following formulae:

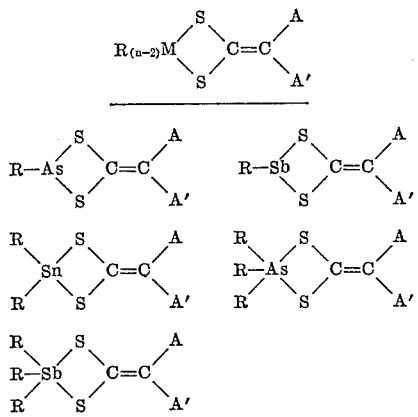

Representative organo dihalides of trivalent arsenic in Formula IV are alkyl- and aryl-dihaloarsines, such as methyldichloroarsine, methyldiiodoarsine, methyldichloroarsine, ethyldibromoarsine, amyldibromoarsine, heptyldichloroarsine, trifluoromethyldibromoarsine, ethoxyetheyldichloroarsine, phenyldibromoarsine, phenyldiiodoarsine, phenyldichloroarsine, o-tolyldichloroarsine, 2-naphthyldichloroarsine, p-chlorophenyldichloroarsine, m-nitrophenyl dichloroarsine, 2,5 - dimethylphenyldichloroarsine, 4-acetamidophenyldichloroarsine, benzyldichloroarsine, etc.

Representative organo dihalides of pentavalent arsenic in Formula V are trialkyl- and triaryl-dihaloarsenic compounds, such as trimethyldichloroarsenic, trimethyldibromoarsenic, triethyldiiodoarsenic, diethylphenyldichloroarsenic, diphenylethyldichloroarsenic, ethylphenyl - p-tolyldichloroarsenic, triphenyldichloroarsenic, tri-p-tolyldichloroarsenic, tri-1-naphthyldichloroarsenic, etc.

Representative organo dihalides of trivalent antimony in Formula VI are alkyl- and aryl-dihalostibines, such as methyldichlorostibine, ethyldichlorostibine, phenyldiiodostibine, p - nitrophenyldichlorostibine, p - tolyldichlorostibine, p-ethylphenyldichlorostibine, 2-naphthyldichlorostibine, etc.

Representative organo dihalides of pentavalent antimony in Formula VII are trialkyl- and triaryl-dihaloantimony compounds, such as trimethyldibromoantimony, trimethyldichloroantimony, triphenyldibromoantimony, triphenyldichloroantimony, triphenyldiiodoantimony, tris-(p-chlorophenyl)dichloroantimony, tri-2,4-xylyldichloroantimony, tri-1-naphthyldibromoantimony, etc.

Representative organo-tin dihalides of Formula VIII are dialkyl- and diaryl-dihalo-tin compounds such as dimethyldichlorotin, diethyldibromotin, dibutyldibromotin, diamyldichlorotin, dioctyldichlorotin, didecydichlorotin, butylpropyldichlorotin, diphenyldiiodotin, di - p - tolyldichlorotin, bis(p - methoxyphenyl)dichlorotin, dibenzyldiiodotin, dicyclohexyldichlorotin, etc.

The following examples in which parts and percentages are by weight, are presented to further illustrate the present invention.

EXAMPLE 1

2,2-dibutyl-4-dicyanomethylene-1,3,2-dithiastannetane

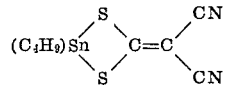

A mixture of 3.04 parts (0.01 mole) of dibutyldichlorotin and 2.18 parts (0.01 mole) of dipotassium dimercaptomethylenemalonitrile is triturated at room temperature in about 10 parts of dimethylformamide. Water is added and the precipitate is recrystallized from isopropanol. The product melts at 253–254.5° C.

EXAMPLE 2

4-dicyanomethyllene-2-phenyl-1,3,2-dithiarsetane

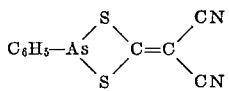

A mixture of 2.18 parts (0.01 mole) of dipotassium dimercaptomethylenemalonitrile and 4.06 parts (0.01 mole) of phenyldichloroarsine is triturated in about 2 parts of dimethylformamide at room temperature. After two hours with revolution of heat, water is added. The precipitate is separated and washed successively with water, methanol, and ligroin. The product melts at 176.5–178.5° C.

EXAMPLE 3

4-dicyanomethylene-2,2-diphenyl-1,3,2-dithiastannetane

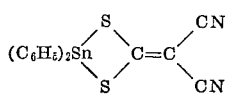

A solution of 3.44 parts (0.01 mole) of diphenyldichlorotin in about 15 parts of dimethylformamide is added to a solution of 2.18 parts (0.01 mole) of dipotassium dimercaptomethylenemalonitrile in about 15 parts of dimethylformamide. After ten minutes, the reaction mixture is poured into about 500 parts of water. The product, after filtering, and recrystallizing from ethyl acetate, has a melting point of 143.5–145.0° C.

EXAMPLE 4

4-dicyanomethylene-2,2,2-triphenyl-1,3,2-dithiastibetane

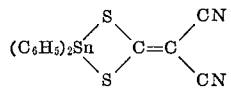

A mixture of 2.12 parts (0.005 mole) of triphenyldichloroantimony and 1.20 parts (0.0055 mole) of dipotassium dimercaptomethylenemalonitrile in about 5 parts of dimethylformamide is agitated with slight evolution of heat. Water is gradually added. The precipitate is filtered, washed with water, methanol and fiinally recrystallized from methanol. The product melts at 129.5–131.5° C.

EXAMPLE 5

2,2-dibutyl-4-nitromethylene-1,3,2-dithiastannetane

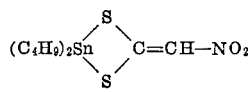

A mixture of 3.04 parts (0.01 mole) of dibutyldichlorotin and 2.13 parts (0.01 mole) of dipotassium 2-nitro-1,1-ethylenedithiol is triturated in about two parts of dimethylformamide. Water is added, the precipitate is separated by filtration, and washed with water, methyl alcohol and ethyl acetate. The product melts at 122.5–124.5° C.

EXAMPLE 6

4-nitromethylene-2-phenyl-1,3,2-dithiarsetane

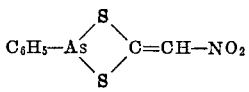

A mixture of 2.13 parts (0.01 mole) of dipotassium 2-nitro-1,1-ethylenedithiol and 4.06 parts (0.01 mole) of phenyldichloroarsine is triturated in about 2 parts of dimethylformamide. The reaction mixture is then poured into about 500 parts of water. A gummy precipitate is triturated with water until it becomes granular. The precipitate is recrystallized by dissolving in ethyl acetate and pouring into ligroin. The product, after filtering, washing with ligroin and drying, melts at 131.5–134.0° C.

EXAMPLE 7

2,2-diphenyl-4-nitromethylene-1,3,2-dithiastannetane

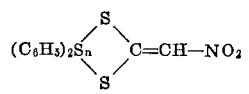

Solutions of 6.88 parts of diphenyldichlorotin in about 10 parts of dimethylformamide and 4.29 parts of dipotassium 2-nitro-1,1-ethylenedithiol in about 5 parts of dimethylformamide are combined. The resulting solution is slowly added to about 1,500 parts of water containing a little salt. The yellow precipitate is separated by filtration, washed with water and dried. The product, after triturating with benzene and washing with ligroin, melts at 151.5–153.0° C.

EXAMPLE 8

4-dicyanomethylene-2,2,2-trimethyl-1,3,2-dithiarsetane

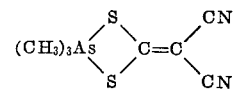

Following the procedure of Example 2, except for the use of an equimolar amount of trimethyldibromoarsenic as the dihalide, the above product is obtained.

EXAMPLE 9

4-dicyanomethylene-2,2-dibenzyl-1,3,2-dithiastannetane

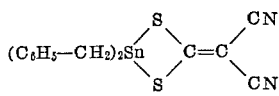

Following the procedure of Example 1, except for the use of an equimolar amount of dibenzyldibromotin as the dihalide, the above product is obtained.

EXAMPLE 10

4-dicyanomethylene-2-(2 - naphthyl)-1,3,2-dithiastibetane

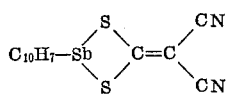

Following the procedure of Example 1, except for the use of an equimolar amount of 2-naphthyldichlorostibine as the dihalide, the above product is obtained.

EXAMPLE 11

4-bis(ethoxycarbo)methylene-2,2-diphenyl-1,3,2-dithiastannetane

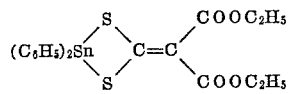

This product is obtained by reacting sodium 2,2-bis(ethoxycarbo)-1,1-ethylenedithiolate in the manner of Example 3.

EXAMPLE 12

4-(1-carbamoyl-1-cyanomethylene)-2-methyl-1,3,2-dithiastibetane

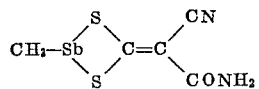

This product is obtained by reacting sodium 2-cyano-2-carbamoyl-1,1-ethylenedithiolate with methyldichlorostibine in the manner of Example 1.

EXAMPLE 13

4-diacetylmethylene-2,2,2-triphenyl-1,3,2-dithiarsetane

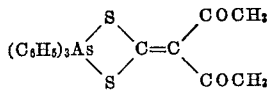

Following the procedure of Example 1, except for the use of equimolecular amounts of triphenyldichloroarsenic and 1,1-dimercapto-2,2-diacetylethylene, the above product is obtained.

I claim:

1. A compound of the formula.

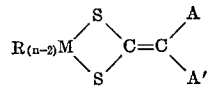

wherein M is a polyvalent metal selected from the group consisting of antimony, arsenic and tin; R is a monovalent hydrocarbyl radical selected from the group consisting of lower alkyl, monocyclic and bicyclic aromatic, and monocyclic ar(lower alkyl); $n$ is the valence of M; A is a monovalent radical selected from the group consisting of CN, COOR, CONH$_2$, CONHR, CONR$_2$, COR and NO$_2$; and A' is a member selected from the group consisting of hydrogen and A.

2. The compound 2,2-dibutyl-4-dicyanomethylene-1,3,2-dithiastannetane.

3. The compound 4-dicyanomethylene-2-phenyl-1,3,2-dithiarsetane.

4. The compound 4-dicyanomethylene-2,2-diphenyl-1,3,2-dithiastannetane.

5. The compound 4-dicyanomethylene-2,2,2-triphenyl-1,3,2-dithiastibetane.

6. The compound 2,2-dibutyl-4-nitromethylene-1,3,2-dithiastannetane.

References Cited

UNITED STATES PATENTS 3,317,573    5/1967    Stamm et al. _____ 260—429.7

TOBIAS E. LEVOW, *Primary Examiner.*

W. F. W. BELLAMY, *Assistant Examiner.*

U.S. Cl. X.R.

260—440, 999, 446; 71—97, 83, 105, 106, 118, 123, 125